United States Patent
Page

(10) Patent No.: US 6,523,103 B2
(45) Date of Patent: Feb. 18, 2003

(54) DISABLEMENT OF A WRITE FILTER STORED ON A WRITE-PROTECTED PARTITION

(75) Inventor: John Michael Page, Colorado Springs, CO (US)

(73) Assignee: Agilent Technologies, Inc., Palo Alto, CA (US)

(*) Notice: Subject to any disclaimer, the term of this patent is extended or adjusted under 35 U.S.C. 154(b) by 13 days.

(21) Appl. No.: 09/908,148

(22) Filed: Jul. 17, 2001

(65) Prior Publication Data

US 2003/0018865 A1 Jan. 23, 2003

(51) Int. Cl.⁷ .............................................. G06F 12/00
(52) U.S. Cl. ........................ 711/173; 711/163; 711/170; 713/2
(58) Field of Search ............................. 711/163, 170, 711/173; 713/2

(56) References Cited

U.S. PATENT DOCUMENTS

| | | | | |
|---|---|---|---|---|
| 5,452,430 A | * | 9/1995 | Dievendorff et al. | 711/170 |
| 5,708,776 A | * | 1/1998 | Kikinis | 714/10 |
| 5,887,163 A | * | 3/1999 | Nguyen et al. | 713/2 |
| 5,987,605 A | * | 11/1999 | Hill et al. | 713/100 |
| 6,385,721 B1 | * | 5/2002 | Puckette | 713/2 |
| 2001/0032300 A1 | * | 10/2001 | Olson | 711/162 |

* cited by examiner

*Primary Examiner*—Reba I. Elmore

(57) ABSTRACT

A computer system having at least primary and secondary partitions, a primary write filter for write-protecting the primary partition, and a state machine. The state machine, in response to a need to write persistent data to the primary partition, boots to the secondary partition, disables the primary write filter, boots to the primary partition, writes persistent data to the primary partition, re-enables the primary write filter, and then reboots to the primary partition.

20 Claims, 10 Drawing Sheets

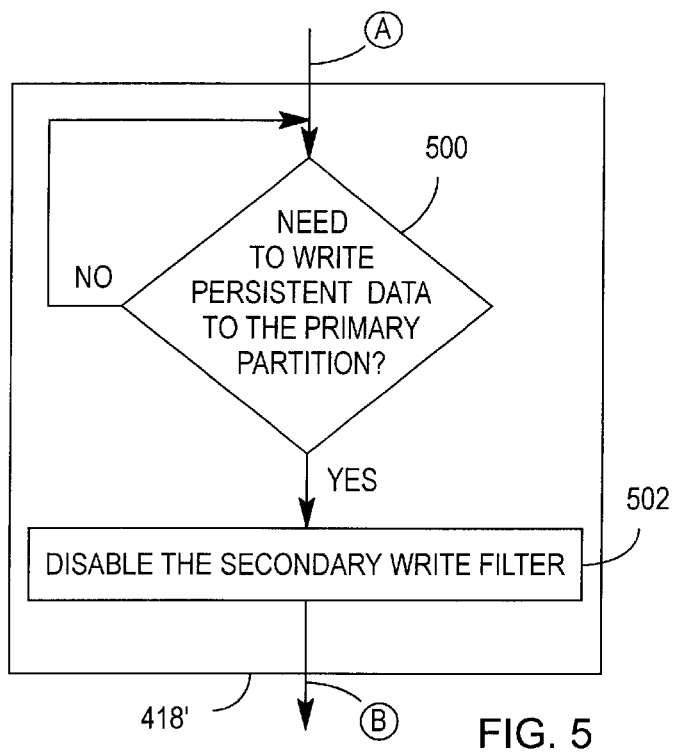
FIG. 5
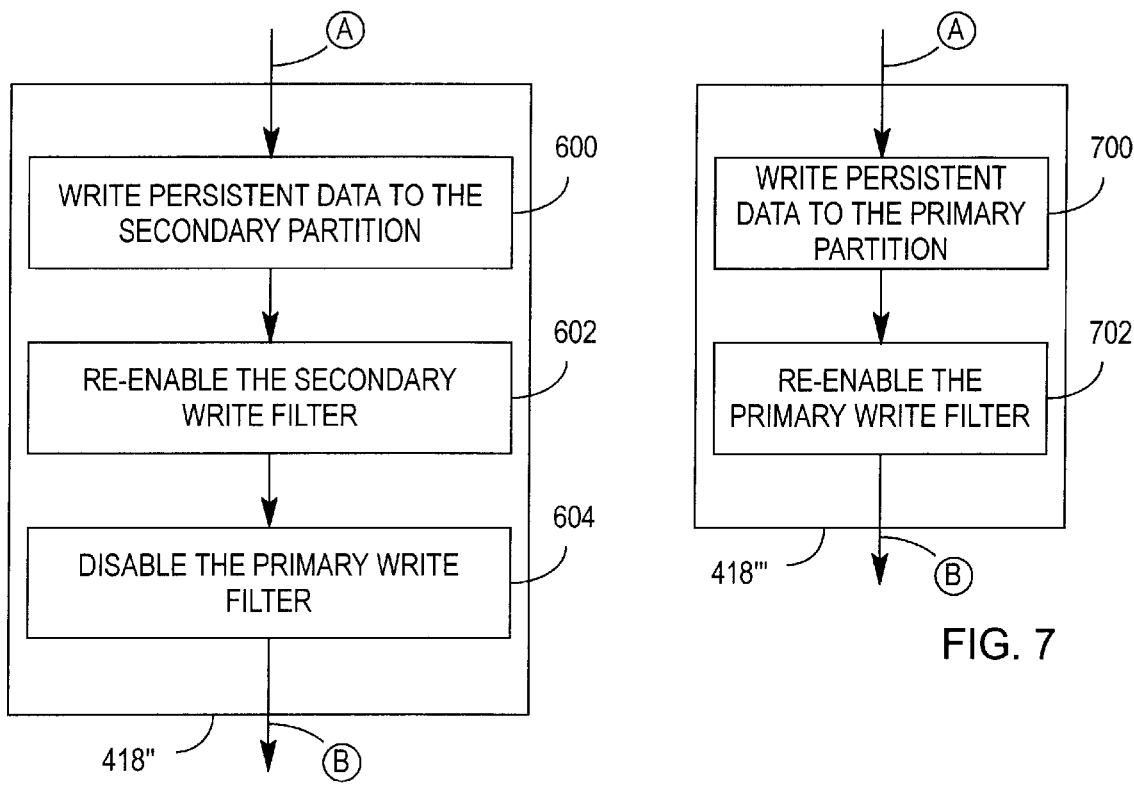
FIG. 6
FIG. 7

DISABLEMENT OF A WRITE FILTER STORED ON A WRITE-PROTECTED PARTITION

FIELD OF THE INVENTION

The invention generally pertains to computer systems, and more specifically, to the disablement of a write filter that is stored on a write-protected partition of a computer system.

BACKGROUND OF THE INVENTION

Computer systems generally store data in memory and/or mass storage. Memory may comprise, for example, main memory and cache memory. Mass storage may comprise, for example, a number of storage drives such as hard drives and/or removable media drives.

Memory and mass storage components may be classified, in one respect, as either persistent or non-persistent. A persistent component stores data between boots of a computer system, whereas a non-persistent component does not (i.e., data stored in a non-persistent component is flushed between boots). In today's computer systems, memory is largely comprised of non-persistent components, and mass storage is largely comprised of persistent components.

Regardless of whether a component is persistent or non-persistent, the data stored therein is subject to corruption due to power surges, hard power downs, viruses, and so on. Although corrupted data may be cleared from non-persistent components by rebooting, it is much more difficult to remove corrupted data from persistent components—especially when the persistent component is the hard drive which stores a computer system's operating system. Corruption of operating system files can lead to intermittent failures of a computer system, or even worse, prevent the computer system from booting.

To prevent the corruption of data stored in a persistent component, it is sometimes desirable to write-protect the component. If data cannot be written to the component, it is less likely that the data already stored thereon will become corrupted. For example, Microsoft® Windows® NT Embedded provides a write filter which, when enabled, intercepts all writes to designated partitions of mass storage and caches them to main memory. The components that control the NT Embedded write filter are stored as files in a predetermined directory of a computer system's system partition, and are enabled via a write filter status entry of a system registry stored on the same system partition and executed at system boot. Thus, when the designated partitions are merely data partitions, the write filter may be enabled or disabled at will. However, when the designated partitions include the system partition, it is no longer possible to disable the write filter, since doing so would require a persistent write to the system partition, and writes to the system partition are no longer possible. In computer systems wherein it is desired to write-protect data most of the time, but wherein periodic updates to the system partition are occasionally required, this can be problematic. An update to the system partition may be required, for example, to update components of the operating system, to update application components, to change an IP (internet protocol) address associated with the computer system, etc.

SUMMARY OF THE INVENTION

In one preferred embodiment of the invention, a computer system comprises at least primary and secondary partitions, a primary write filter for write-protecting the primary partition, and a state machine. The state machine has at least three states. In the first state, 1) the computer system boots to the primary partition, 2) the primary write filter is enabled, and 3) the state machine advances to a second state in response to a need to write persistent data to the primary partition. In the second state, 1) the computer system boots to the secondary partition, and 2) during the second state, the primary write filter is disabled before the state machine advances to a third state. In the third state, 1) the computer system boots to the primary partition, 2) the primary write filter is initially disabled while persistent data is written to the primary partition, and 3) after persistent data is written to the primary partition, the primary write filter is re-enabled and the state machine advances to the first state.

In another preferred embodiment of the invention, a computer system comprises at least primary and secondary partitions, a primary write filter for write-protecting the primary partition, and a state machine. The state machine, in response to a need to write persistent data to the primary partition, boots to the secondary partition, disables the primary write filter, boots to the primary partition, writes persistent data to the primary partition, re-enables the primary write filter, and then reboots to the primary partition.

In yet another preferred embodiment of the invention, a method for writing persistent data to a normally write-protected primary partition of a computer system comprises installing an operating system on the primary partition of the computer system, and installing an operating system on a secondary partition of the computer system. A write filter stored on the primary partition is then enabled for the purpose of write-protecting the primary partition. Upon a need to write persistent data to the primary partition, the computer system is booted to the secondary partition, the primary write filter is disabled, the computer system is booted to the primary partition, persistent data is written to the primary partition, the primary write filter is re-enabled, and then the computer system is rebooted to the primary partition.

In one more preferred embodiment of the invention, a computer system comprises at least primary and secondary partitions, a primary write filter for write-protecting the primary partition, and a state machine having at least two states. In the first state, 1) the computer system boots to the primary partition, 2) the primary write filter is enabled, and 3) the state machine advances to a second state in response to a need to write persistent data to the primary partition. In the second state, 1) the computer system boots to the secondary partition, and 2) during the second state, persistent data is written to the primary partition before the state machine advances to the first state.

The advantages of these and other embodiments of the invention will be further explained in, or will become apparent from, the accompanying description, drawings and claims.

BRIEF DESCRIPTION OF THE DRAWINGS

Illustrative and presently preferred embodiments of the invention are illustrated in the drawings, in which:

FIG. 5 illustrates a preferred embodiment of state-specific code which is executed during the RUNBOOT state of the FIG. 3 state machine;

FIG. 6 illustrates a preferred embodiment of state-specific code which is executed during the PREPBOOT state of the FIG. 3 state machine;

FIG. 7 illustrates a preferred embodiment of state-specific code which is executed during the COMPLETEBOOT state of the FIG. 3 state machine;

DESCRIPTION OF THE PREFERRED EMBODIMENT

Figure 1:
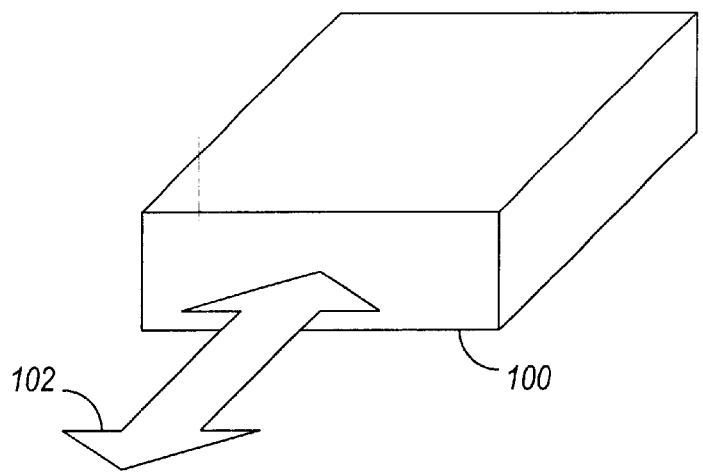
FIG. 1 illustrates a preferred embodiment of a computer system.

FIG. 1 illustrates a preferred embodiment of a computer system 100.

The computer system is connected to power and data sources by means of a plurality of cables 102. The plurality of cables may comprise, for example, power cables, serial interface cables, parallel interface cables, USB interface cables, RJ-45 cables, and/or other cables which might be necessary for powering and communicating with the computer system 100.

Although the computer system 100 may comprise ports for connecting a monitor, keyboard and mouse thereto, the computer need not comprise such ports. For example, the computer system 100 might be a rack-mounted VQT (voice quality tester) with no directly connected monitor, keyboard or mouse.

Figure 2:
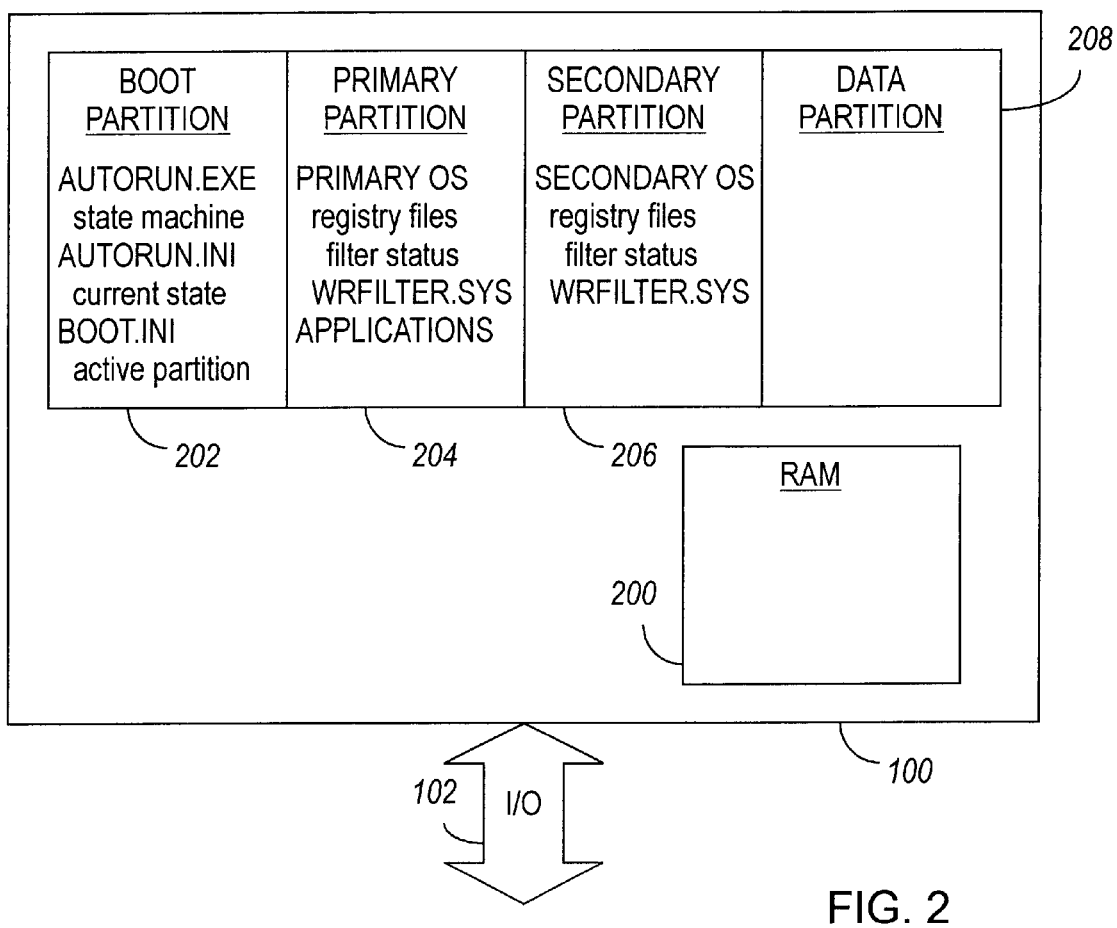
FIG. 2 illustrates a preferred embodiment of the memory and mass storage components found within the FIG. 1 computer system.

FIG. 2 illustrates a preferred embodiment of the memory 200 and mass storage 202–208 components found within the FIG. 1 computer system 100. Although the memory component 200 is shown as a single block of RAM (random access memory), the memory component could comprise main memory, cache memory, memory hierarchies, and/or other memories.

The mass storage 202–208 of the FIG. 1 computer system 100 is shown in FIG. 2 to comprise various partitions. These partitions could be partitions of a single mass storage component (e.g., a single hard drive) or partitions of multiple mass storage components (e.g., two or more hard drives, or a combination of hard drives and removable media drives).

The partitions shown in FIG. 2 comprise a boot partition 202, a primary partition 204, a secondary partition 206, and a data partition 208. A plurality of files for performing the initial boot tasks of a computer system 100 may be stored on the boot partition 202. By way of example, these files are shown in FIG. 2 to include the files AUTORUN.EXE, AUTORUN.INI, and BOOT.INI. The file AUTORUN.EXE is an executable file comprising program code for implementing a state machine. The file AUTORUN.INI is a text file comprising an entry which, during boot, specifies the state (current state) which the state machine is to assume. The file BOOT.INI is a text file comprising an entry which, during boot, specifies the active partition to which the computer system 100 should boot.

Installed on the primary partition 204 is a primary copy of the computer system's operating system. The primary partition 204 is bootable so that the computer system can boot to the primary partition 204 and run a number of applications stored thereon. In a preferred embodiment, the operating system stored on the primary partition 204 is Microsoft® Windows® NT Embedded. The components of NT Embedded which are installed on the primary partition include a system registry (designated as "registry files"), and a write filter (WRFILTER.SYS). A write filter status entry in the system registry specifies whether the write filter is enabled (i.e., ON) or disabled (i.e., OFF). In Microsoft® Windows® NT Embedded, the write filter status entry is found in:

HKLM\System\CurrentControlSet\Services\wrfilter

Installed on the secondary partition 206 is a secondary copy of the computer system's operating system. The secondary partition 206 is also bootable. Although applications could also be run from the secondary partition 206, it is preferable that they only be run from the primary partition. In a preferred embodiment, the operating system stored on the secondary partition 206 is also NT Embedded, and many or all of the NT Embedded components installed on the primary partition 204 are duplicated on the secondary partition 206. In this manner, the secondary partition stores a backup to the operating system installed on the primary partition. Note, however, that the operating system installed on the secondary partition 206 could, in fact, differ from the operating system which is installed on the primary partition 204. As shown in FIG. 2, the components of NT Embedded which are installed on the secondary partition include a system registry (designated as "registry files"), and a write filter (WRFILTER.SYS). A write filter status entry in the system registry specifies whether the write filter is enabled (i.e., ON) or disabled (i.e., OFF).

Note that although the system registries and write filters stored on the primary and secondary partitions 204, 206 bear the same names, they are not the same files (i.e., a distinct copy of each is stored on each partition 204, 206).

The data partition 208 may store any number of files, some or all of which may be saved to the data partition 208 so that they may later be persisted to the primary and secondary partitions 204, 206.

Figure 3:
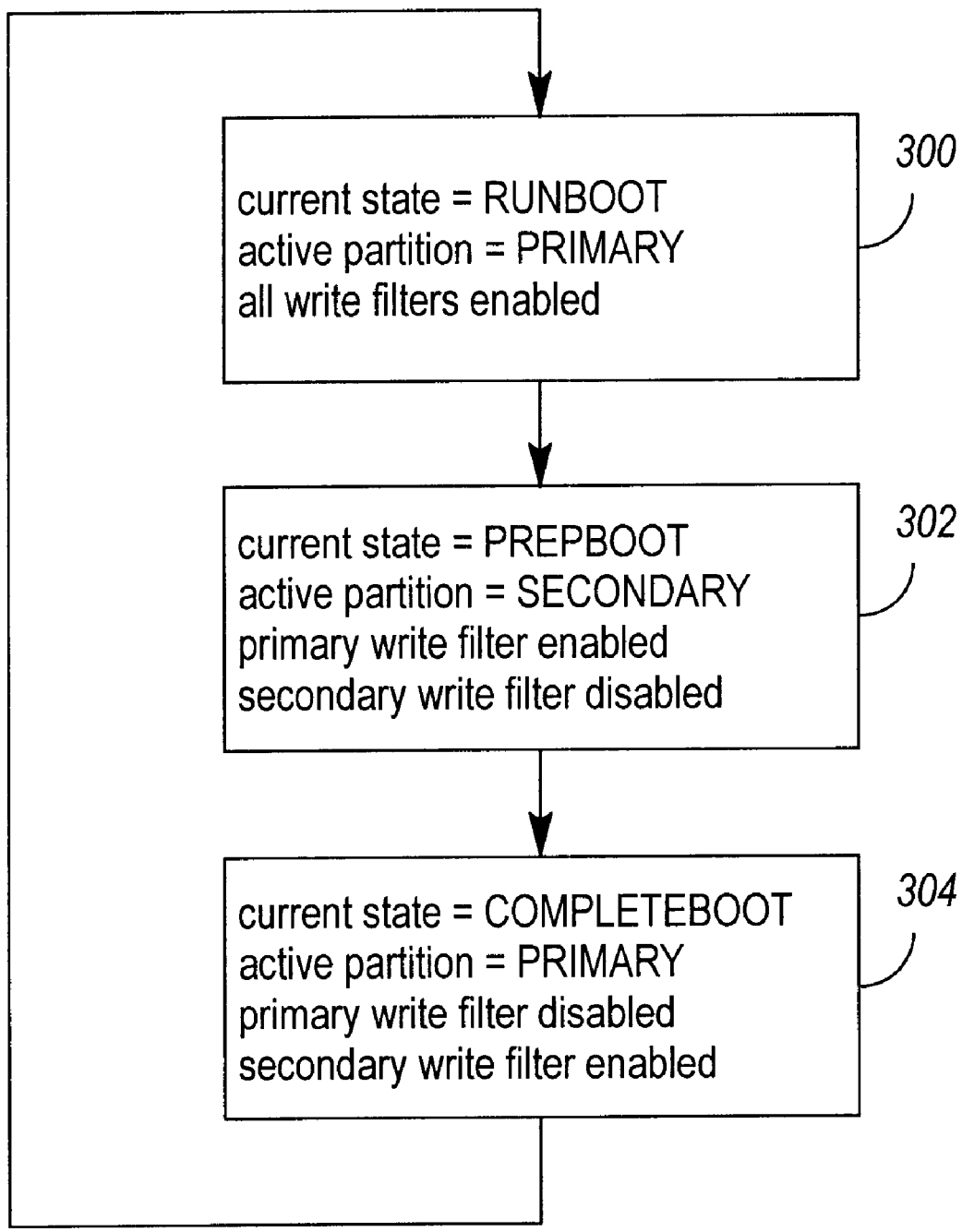
FIG. 3 illustrates various states of a state machine which executes on the FIG. 1 computer system.

The state machine coded in AUTORUN.EXE alternately disables the write filters of each of the primary and secondary partitions 204, 206 so that persistent data can be written to each of these normally write-protected partitions 204, 206. In a preferred embodiment, the state machine comprises at least three states 300, 302, 304. These states are illustrated in FIG. 3 as RUNBOOT 300, PREPBOOT 302, and COMPLETEBOOT 304. Additional states may be inserted between the RUNBOOT 300, PREPBOOT 302, and COMPLETEBOOT 304 states, but these states are not shown in FIG. 3. Additional states might be desirable, for example, for performing tasks which are related to and/or distinct from those which are disclosed herein.

In the embodiment disclosed herein, the state machine executes from the boot partition 202 and is entirely coded within the file AUTORUN.EXE. However, the state machine could alternately be run from any partition or even multiple partitions. For example, it could be broken into multiple executables, with each executable containing the code corresponding to the states which affect its partition. Or, for example, duplicate state machine code could be stored and run from each of the primary and secondary partitions 204, 206. However, compiling all of the state machine code into a single executable which executes from a write-enabled boot partition 202 allows for easy upgrade of the state machine code, and avoids compatibility issues that might arise if separate executables were upgraded independently.

Under normal operation, the state machine operates in the RUNBOOT state 300. During the RUNBOOT state 300, the computer system 100 boots to its primary partition 204 (i.e., the primary partition 204 is the active partition) and write filters on both the primary and secondary partitions 204, 206 are enabled. However, the write filter stored on the primary partition 204 (i.e., the primary write filter) is active, while the write filter stored on the secondary partition 206 (i.e., the secondary write filter) is inactive. The secondary write filter is inactive as a result of the secondary partition 206 not being the partition to which the computer system 100 boots. During the RUNBOOT state 300, the computer system 100 is monitored for a need to write persistent data to the primary partition 204. In response to such a need, the state machine disables the secondary write filter and advances to the PREPBOOT state 302. The secondary write filter may be disabled, for example, by renaming it so that it cannot be found by the secondary operating system.

During the PREPBOOT state 302, the computer system 100 boots to its secondary partition 206 (i.e., the secondary partition 206 is the active partition). Since the secondary write filter is disabled during the RUNBOOT state 300, the secondary partition 206 is not write-protected during the PREPBOOT state 302 (i.e., the secondary partition is write-enabled). Furthermore, although the primary write filter is enabled, it is inactive as a result of the primary partition 204 not being the partition to which the computer system 100 boots. During the PREPBOOT state 302, the persistent data which needs to be written to the primary partition 204 may be written to the secondary partition 206. At some point during the PREPBOOT state 302, the state machine disables the primary write filter, and re-enables the secondary write filter. The primary write filter may be disabled, for example, by renaming it so that it cannot be found by the primary operating system. The secondary write filter may be re-enabled, for example, by renaming it so that it can be found by the secondary operating system. Note that although the secondary write filter is re-enabled, it is not active, and will not be active, until the computer system 100 boots to the secondary partition 206 while the secondary write filter is enabled. After writes of persistent data to the secondary partition 206 are completed, the state machine advances to the COMPLETEBOOT state 304.

During the COMPLETEBOOT state 304, the computer system 100 once again boots to its primary partition 204. Since the primary write filter is disabled during the PREPBOOT state 302, the primary partition 204 is not write-protected during the COMPLETEBOOT state 304 (i.e., the primary partition is write-enabled). Furthermore, although the secondary write filter is enabled, it is inactive as a result of the secondary partition 206 not being the partition to which the computer system 100 boots. During the COMPLETEBOOT state 304, the persistent data which needs to be written to the primary partition 204 is written to the primary partition 204. At some point during the COMPLETEBOOT state 304, the state machine re-enables the primary write filter. The primary write filter may be re-enabled, for example, by renaming it so that it can be found by the primary operating system. However, even though the primary write filter is re-enabled, it is not active, and will not be active, until the computer system 100 boots to the primary partition 204 while the primary write filter is enabled. After writes of persistent data to the primary partition 204 are completed, the state machine advances to the RUNBOOT state 300, and the state machine recycles through its states.

Figure 4:
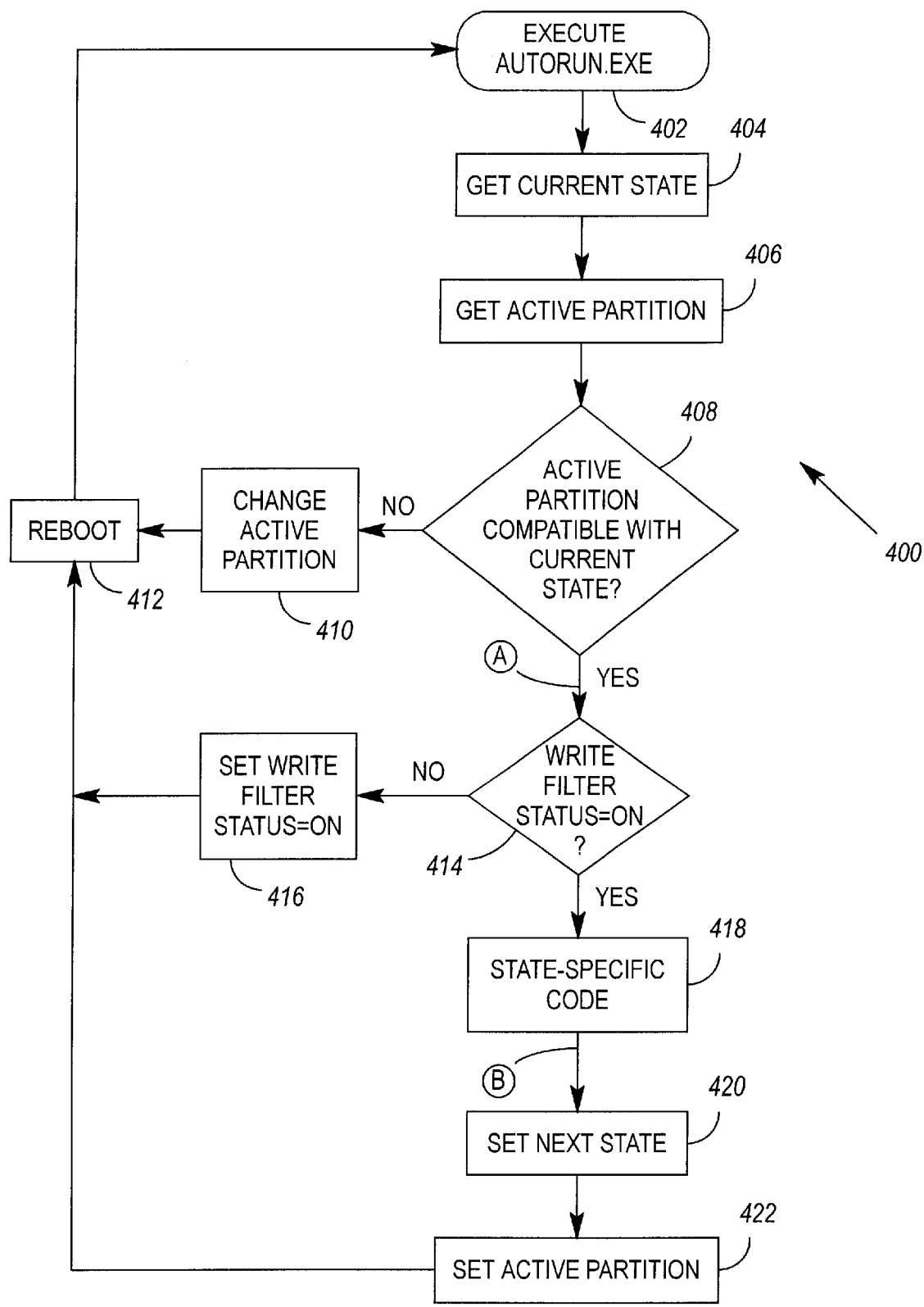
FIG. 4 illustrates a preferred method of operation of the FIG. 3 state machine.

FIG. 4 illustrates a preferred method 400 of operation of the state machine coded in AUTORUN.EXE. If NT Embedded is the operating system stored on each of the primary and secondary partitions 204, 206 illustrated in FIG. 2, then it is preferable that AUTORUN.EXE be coded as a case statement that runs as an NT Embedded service. That is, it is preferable that AUTORUN.EXE be triggered during boot, without any requirement that a user first log in. However, AUTORUN.EXE could alternately be coded as a plurality of objects, as one or more standalone applications, etc.

Execution of the state machine code begins at block 402. At block 404, the state machine determines which state it is to assume by retrieving a current state. In a preferred embodiment, the current state is stored in the AUTORUN.INI file. The state machine next determines at block 406 which partition is to be the active partition (i.e., the partition to which the computer system 100 will boot). In a preferred embodiment, the active partition is stored in the BOOT.INI file. Note that the current state and active partition could be retrieved from various files, and could be stored in the same file. However, the current state and active partition are stored as indicated herein so as to be compatible with requirements of the NT Embedded operating system.

At block 408, it is determined whether the active partition is compatible with the current state. If the active partition and current state are not compatible, then the state machine changes the active partition to be compatible with the current state at block 410, and the computer system 100 is rebooted at block 412. The active partition and current state may not be compatible, for example, if the state machine writes its next state to the AUTORUN.INI file, but then fails to write the next active partition to the BOOT.INI file due to a power surge or some other event. If the active partition and current state are compatible, then the state machine determines at block 414 whether the write filter status entry stored in the system registry of the active partition is enabled (i.e., filter status=ON). If the write filter is not enabled in the active partition's system registry, then the state machine enables it (i.e., it sets filter status to ON 416) and reboots 412. On the other hand, if the write filter is enabled in the active partition's system registry, then the state machine proceeds to execute state-specific code at block 418.

State-specific code for the state machine's RUNBOOT 300, PREPBOOT 302, and COMPLETEBOOT 304 states is respectively illustrated in FIGS. 5–7 and will be discussed shortly. After state-specific code has executed at block 418, the state machine's next state is set at block 420, and the computer system's next active partition is set at block 422. The computer system 100 is then rebooted at block 412, and the state machine cycles through its next state.

Figure 8:
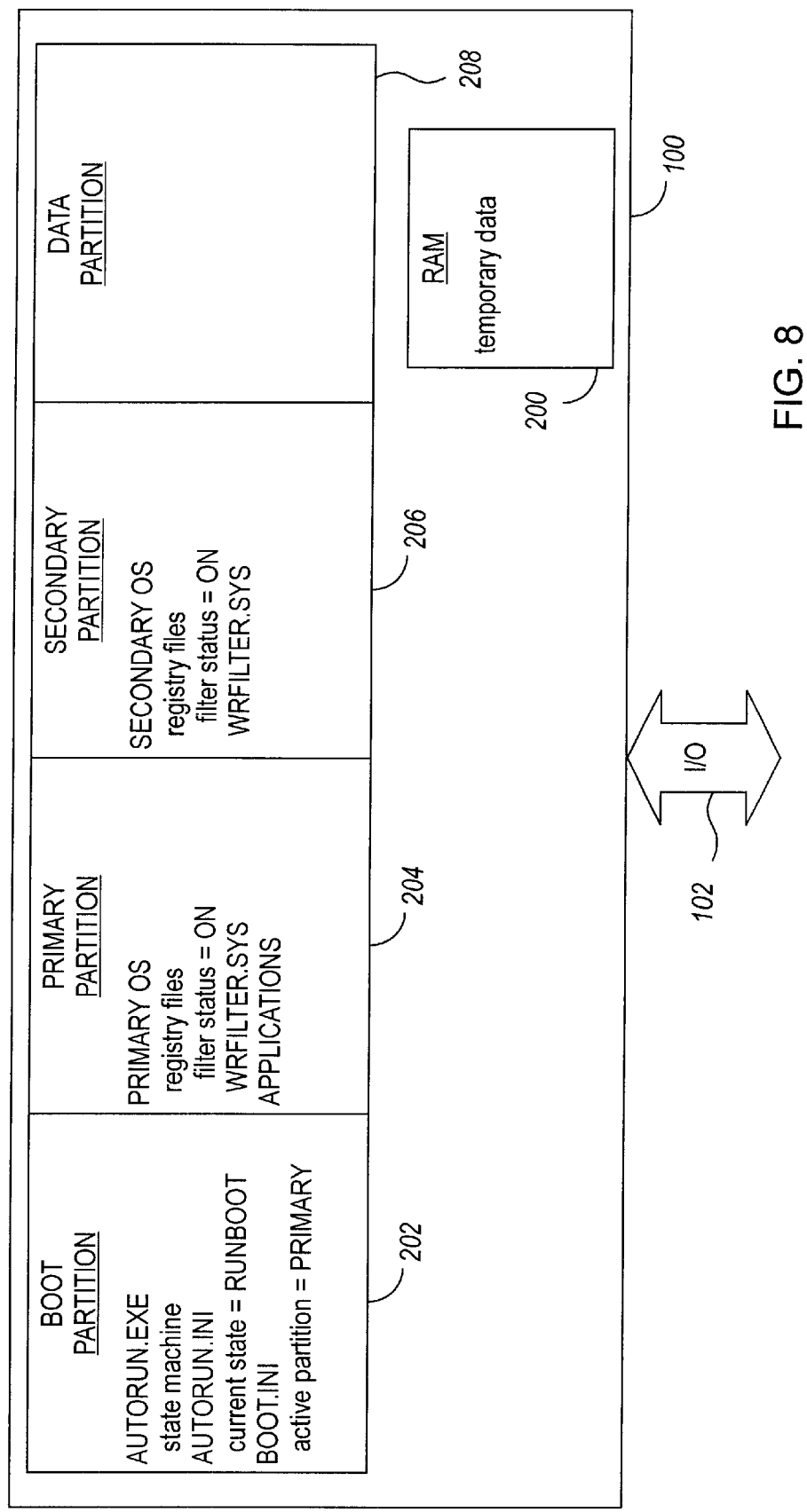
FIG. 8 illustrates the FIG. 1 computer system as it might exist at the beginning of the afore-mentioned RUNBOOT state.

Operation of the FIG. 4 method 400 is best understood by referring to the hardware diagrams of FIGS. 8–13. FIG. 8 illustrates the computer system 100 as it might exist in its initial state. Copies of an operating system are installed on the computer system's primary and second partitions 204, 206, and the write filter of each operating system is enabled in the operating system's system registry (i.e., filter status= ON). The state machine code AUTORUN.EXE is installed on the computer system's boot partition 202, with the current state of the state machine being set to RUNBOOT in the AUTORUN.INI file, and the active partition of the computer system 100 being set to PRIMARY in the BOOT.INI file.

Figure 9:
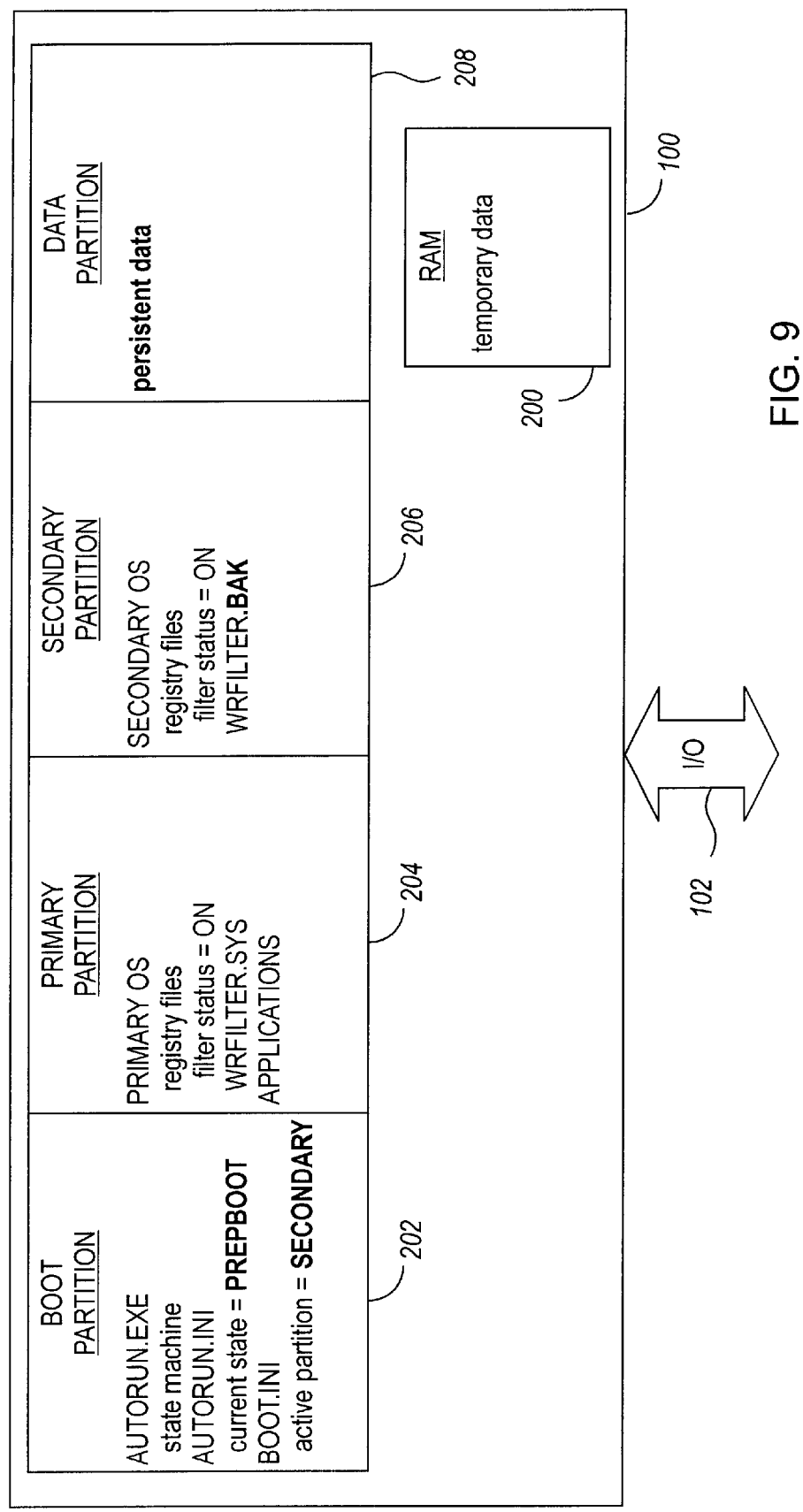
FIG. 9 illustrates the FIG. 1 computer system as it might exist at the close of the afore-mentioned RUNBOOT state.
Figure 10:
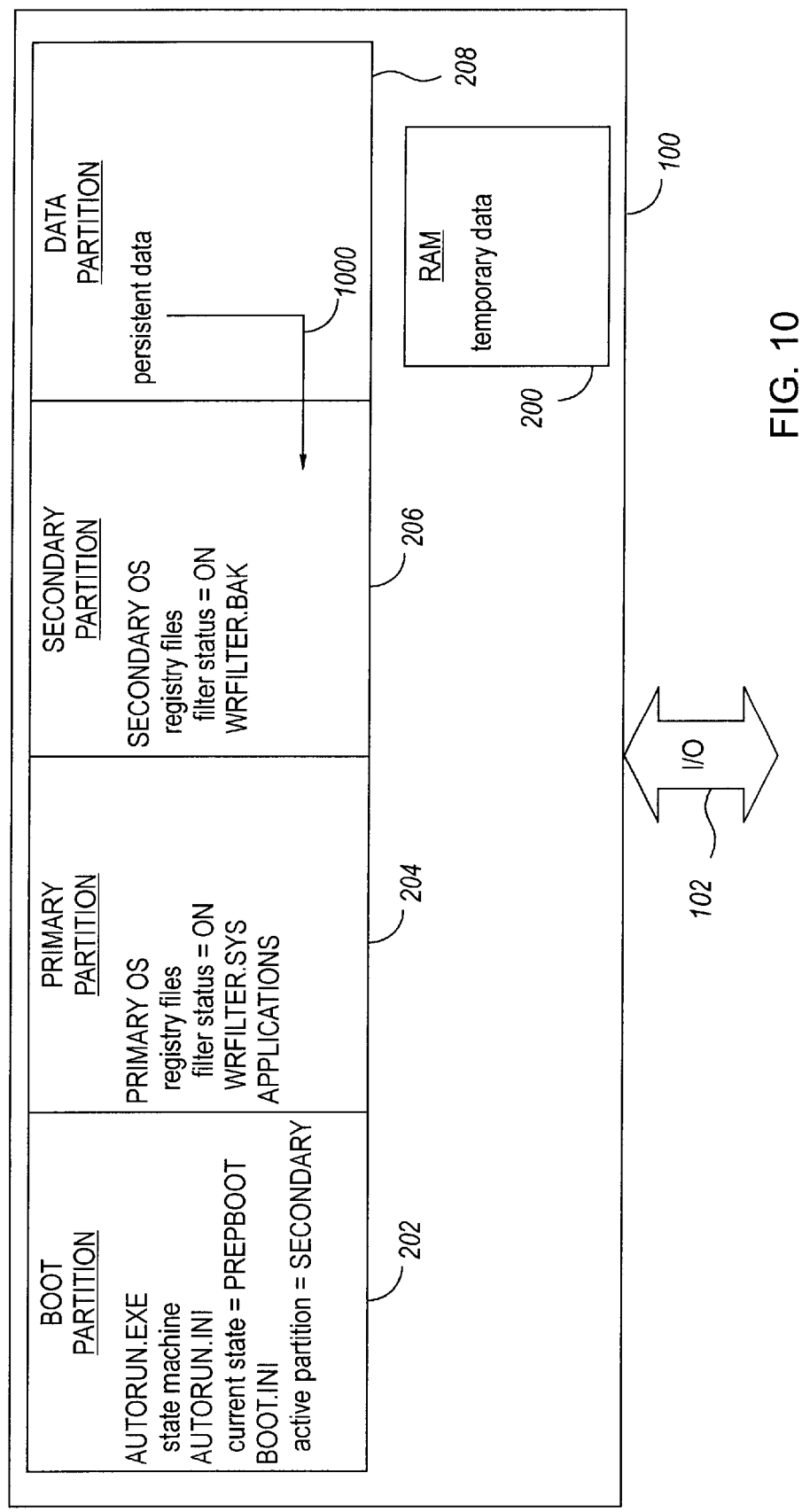
FIG. 10 illustrates the FIG. 1 computer system as it might exist at the beginning of the afore-mentioned PREPBOOT state.
Figure 11:
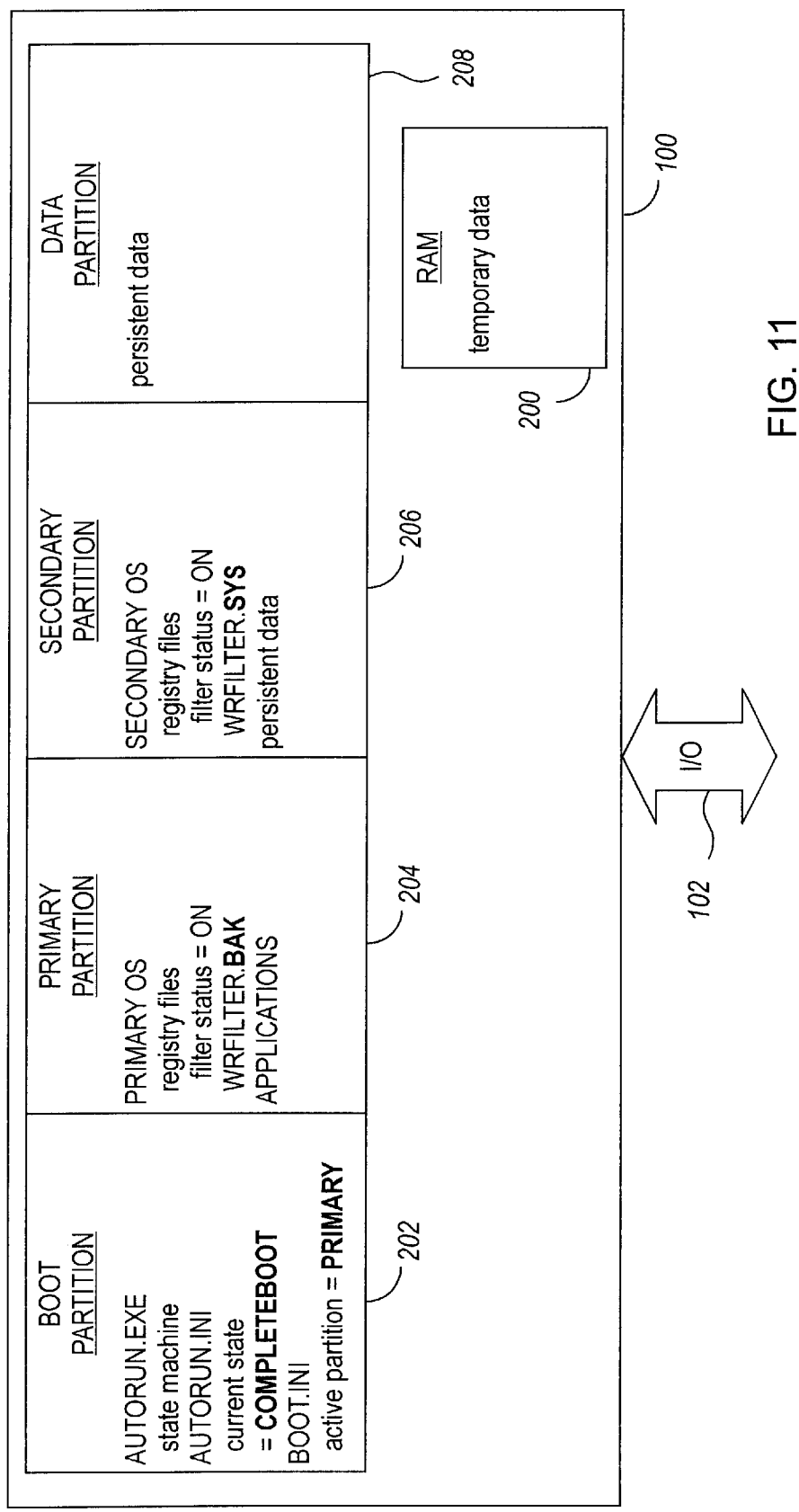
FIG. 11 illustrates the FIG. 1 computer system as it might exist at the close of the afore-mentioned PREPBOOT state.
Figure 12:
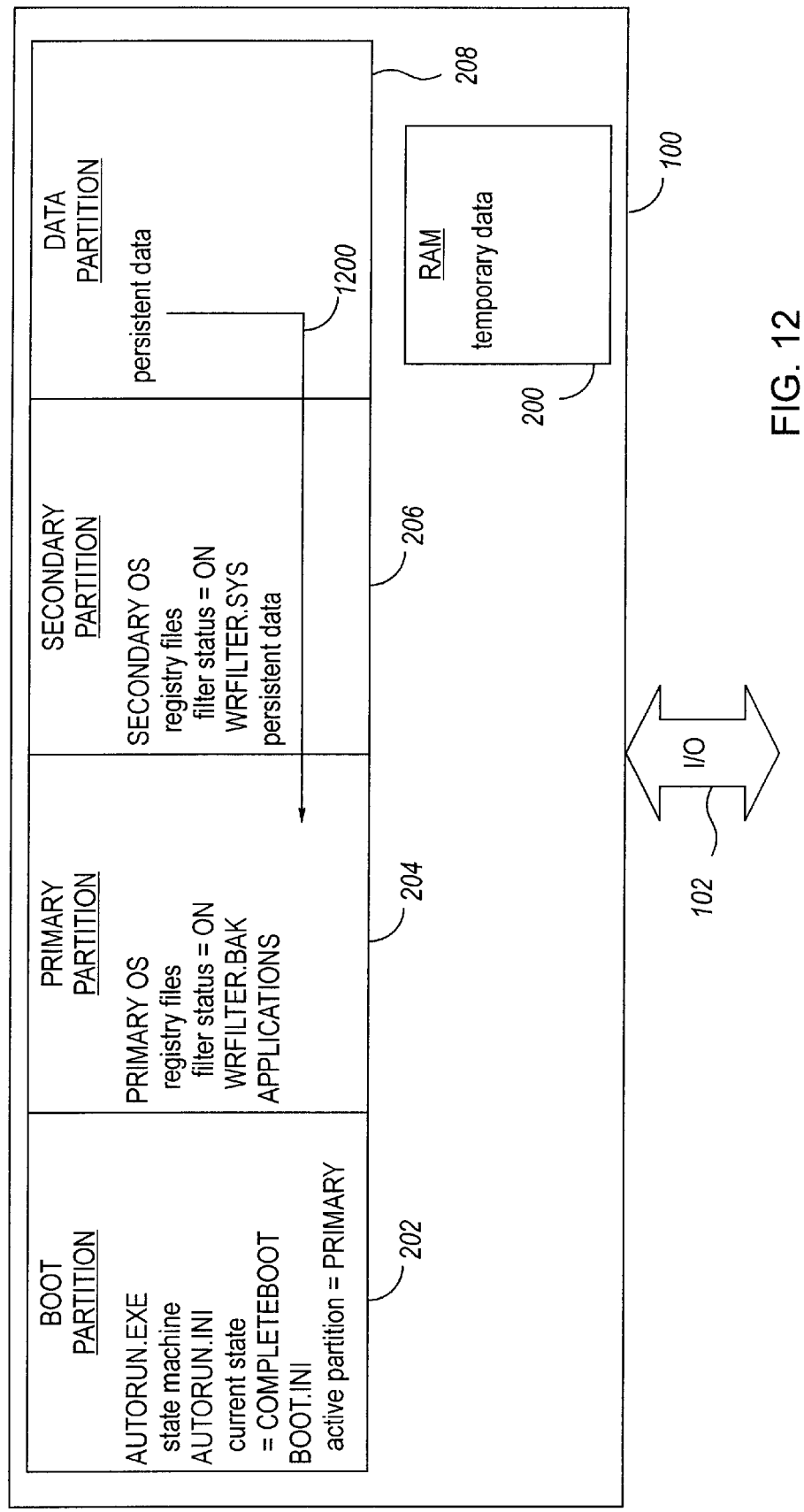
FIG. 12 illustrates the FIG. 1 computer system as it might exist at the beginning of the afore-mentioned COMPLETE-BOOT state.
Figure 13:
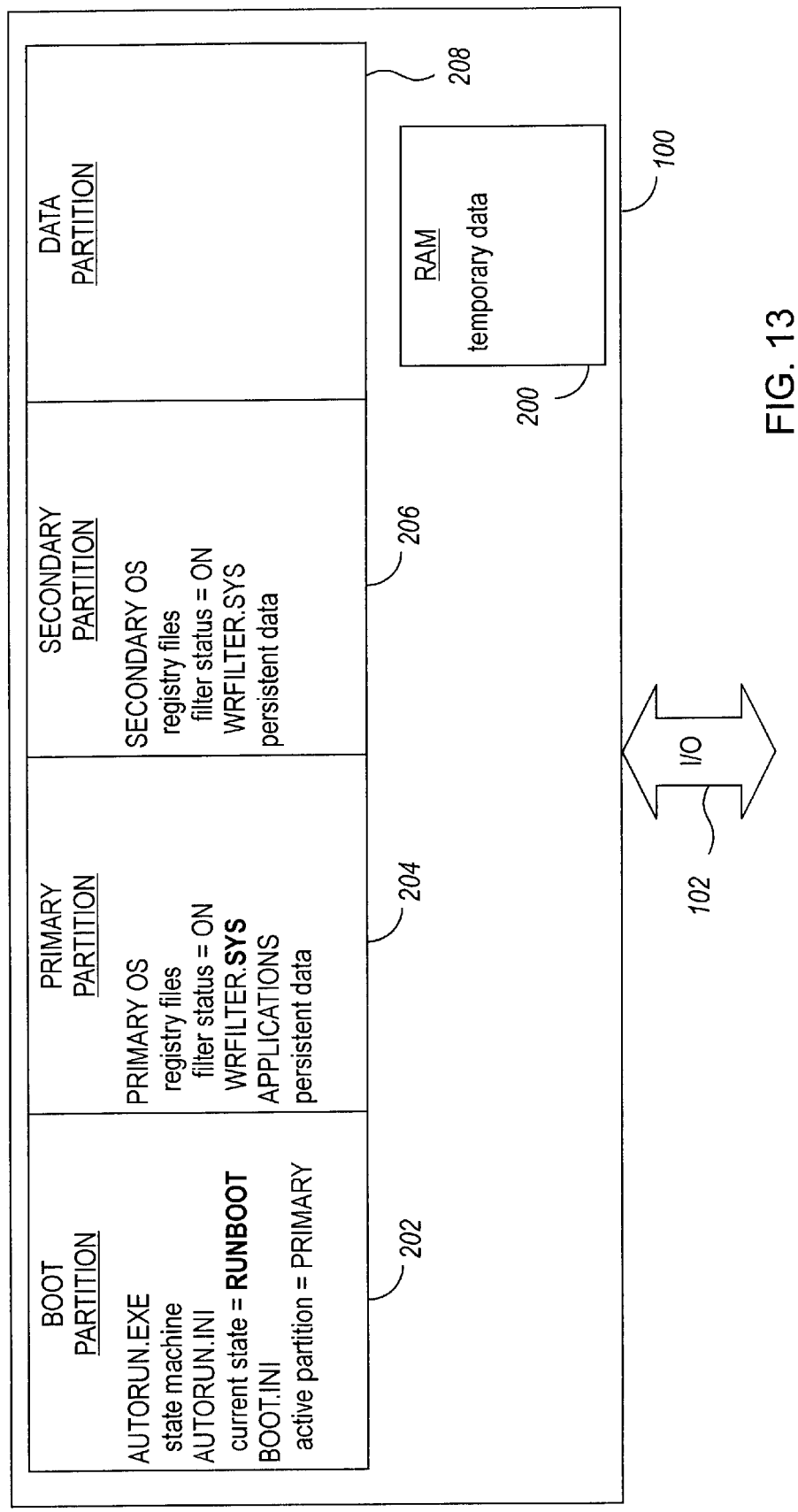
FIG. 13 illustrates the FIG. 1 computer system as it might exist at the close of the afore-mentioned COMPLETEBOOT state.

When the computer system is initially booted, the state machine retrieves 404, 406 its current state (i.e., RUNBOOT) and the active partition (i.e., PRIMARY). See FIGS. 4 and 8. Noting 408 that the current state is compatible with the active partition, the state machine then determines 414 that the write filter of the primary partition 204 is enabled in the partition's system registry (filter status=ON). Thus, the state machine causes the computer system 100 to boot to its primary partition 204. Once booted, the computer system 100 is free to execute the applications stored on the system's primary partition 204. Execution of some or all of these applications may be triggered by the state-specific code of the state machine. Due to the enabled write filter stored on the primary partition 204, all writes to the primary partition 204 are cached in RAM 200. However, the computer system 100 eventually receives a request to write persistent data to the primary partition 204, which request must be executed. Examples of requests which must be executed might include requests to update the computer system's IP (internet protocol) address, requests to upgrade the computer system's operating system or application components, etc. Write requests which must be executed may be identified as such by some form of tagging, or by application or state machine code which is able to identify certain pre-determined types of write requests. When such a request is received, either application or state machine code may cause the data associated with the write request to be written to persistent, write-enabled memory and/or mass storage. In FIG. 9, the data is written to a data partition 208 of the computer system 100 as persistent data. At some point, the state machine becomes aware of the need 500 to write persistent data to the primary partition 204, and the state-specific code 418' illustrated in FIG. 5 is executed. In response to the need to write persistent data to the primary partition 204, the state machine disables 502 the secondary write filter stored on the secondary partition 206. The secondary write filter may be disabled, for example, by renaming it to WRFILTER.BAK. The next state (PREPBOOT) and next active partition (SECONDARY) are then set 420, 422 and the computer system 100 is rebooted 412.

When the computer system is rebooted 412, the state machine retrieves 404, 406 its current state (i.e., PREPBOOT) and the active partition (i.e., SECONDARY). Noting 408 that the current state is compatible with the active partition, the state machine then determines 414 that the write filter of the secondary partition 206 is enabled in the partition's system registry (i.e., filter status=ON). Thus, the state machine causes the computer system 100 to boot to its secondary partition 206. Once booted, the computer system executes the state-specific code 418" corresponding to the PREPBOOT state 302. A preferred embodiment of this code is illustrated in FIG. 6. Preferably, the code writes 600 the persistent data stored on the data partition 208 to the secondary partition 206 (see the arrow 1000 in FIG. 10). In this manner, the operating system stored on the secondary partition 206 may serve as a backup to the operating system stored on the primary partition. The write of persistent data to the secondary partition 206 might require, for example, the setting of an IP address in the system registry of the secondary partition 206, or the launch of Microsoft's InstallShield to update operating system components stored on the secondary partition 206.

Next, the secondary write filter is re-enabled 602. The secondary write filter may be re-enabled, for example, by giving it its original name (WRFILTER.SYS). See FIG. 11. The primary write filter is then disabled 604. The primary write filter may be disabled, for example, by renaming it to WRFILTER.BAK. The next state (COMPLETEBOOT) and next active partition (PRIMARY) are then set 420, 422 and the computer system 100 is once again rebooted 412.

When the computer system is next rebooted 412, the state machine retrieves 404, 406 its current state (i.e., COMPLETEBOOT) and the active partition (i.e., PRIMARY). Noting 408 that the current state is compatible with the active partition, the state machine then determines 414 that the write filter of the primary partition 204 is enabled in the partition's system registry (i.e., filter status= ON). Thus, the state machine causes the computer system 100 to boot to its primary partition 204. Once booted, the computer system executes the state-specific code 418''' corresponding to the COMPLETEBOOT state 304. A preferred embodiment of this code is illustrated in FIG. 7. Preferably, the code writes 700 the persistent data stored on the data partition 208 to the primary partition 204 (see the arrow 1200 in FIG. 12). The write of persistent data to the primary partition 204 might require, for example, the setting of an IP address in the system registry of the primary partition 204, or the launch of Microsoft's InstaliShield to update operating system and/or application components stored on the primary partition 204.

Next, the primary write filter is re-enabled 702. The primary write filter may be re-enabled, for example, by giving it its original name (WRFILTER.SYS). See FIG. 13. The next state (RUNBOOT) and next active partition (PRIMARY) are then set 420, 422 and the computer system 100 is rebooted 412 to its normal operating state (i.e., RUNBOOT).

In the preferred embodiment described above, write filters are disabled by renaming them. Although a write filter may be renamed by changing its filename and/or extension, a write filter may also be renamed via a change in its directory path, and/or by any combination of these or other methods. For example, Microsoft® Windows® NT Embedded expects its write filter to be in the "\winnt\system32\drivers" directory of the system partition. Thus, if it is not found in this directory, it will not be invoked, even though a write filter status entry in a system registry may indicate that the write filter should be invoked.

One may note that even though the secondary write filter is enabled during normal operation of the computer system 100, the write filter is never active during normal operation of the computer system 100. Furthermore, the write filter is never active when the computer system 100 boots to the secondary partition 206 because the write filter is always disabled prior to booting to the secondary partition 206. It is therefore unnecessary that the secondary write filter be enabled at all. The secondary write filter is only enabled herein so as to prevent an inadvertent boot and write to the secondary partition 206.

Various alternatives to the above-described state machine have been contemplated. In one alternate embodiment, persistent data is written to the primary partition 204 during the PREPBOOT state 302; the primary write filter is not disabled during the PREPBOOT state 302; and the COMPLETEBOOT state 304 is skipped. In this embodiment, persistent data may be written to the primary partition only if the write of such data does not need to be performed and/or monitored by the operating system which is installed on the primary partition.

In another alternate embodiment, the secondary partition 206 is only used as a means for disabling the write filter which is stored on the primary partition 204, and no data is written to the secondary partition 206. In this embodiment, the write filter which is stored on the secondary partition 206 may be, for example, 1) always enabled, 2) always disabled, or 3) enabled and disabled as described in the preferred embodiment, supra.

In yet another alternate embodiment, the state machine is manually stepped through its states. This can be done, for example, by opening the AUTORUN.INI and BOOT.INI files in a text editor and manually changing the current state and active partition which are respectively stored therein. However, if a computer system 100 on which the state machine runs is a rack-mounted system or other system which lacks direct access to its user interface via a monitor, keyboard and mouse, a manually stepped state machine can become cumbersome. A manually stepped state machine is also cumbersome if a computer system 100 is always on, and the need to write persistent data to the system's primary partition 204 can arise at any time.

It should be noted that one of ordinary skill in the art will readily comprehend that many of the action and decision blocks 402–422, 500, 502, 600–604, 700, 702 set forth in FIGS. 4–7 may be executed in various orders while still achieving the same end result.

Utilizing the above-described methods and apparatus, one or more partitions 204 of a computer system 100 may be write-protected most of the time, yet the partitions 204 may still be written to in response to identified needs to write persistent data to the partitions. In this manner, the possibility of data corruption due to power surges, hard power downs, viruses, and so on are minimized for the partitions 204.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A computer system, comprising:
   a. at least primary and secondary partitions;
   b. a primary write filter for write-protecting the primary partition; and
   c. a state machine having at least three states, the states comprising:
      i. a first state, wherein:
         1. the computer system boots to the primary partition;
         2. the primary write filter is enabled; and
         3. the state machine advances to a second state in response to a need to write persistent data to the primary partition;
      ii. the second state, wherein:
         1. the computer system boots to the secondary partition; and
         2. during the second state, the primary write filter is disabled before the state machine advances to a third state; and
      iii. the third state, wherein:
         1. the computer system boots to the primary partition;
         2. the primary write filter is initially disabled while persistent data is written to the primary partition; and
         3. after persistent data is written to the primary partition, the primary write filter is re-enabled before the state machine advances to the first state.

2. A computer system as in claim 1, further comprising a secondary write filter for write-protecting the secondary partition, wherein:
   a. during the first state of the state machine, the secondary write filter is disabled; and
   b. during the second state,
      i. the secondary write filter is initially disabled while persistent data is written to the secondary partition; and
      ii. after persistent data is written to the secondary partition, the secondary write filter is re-enabled.

3. A computer system as in claim 1, further comprising a secondary write filter for write-protecting the secondary partition, wherein the secondary write filter is always enabled.

4. A computer system as in claim 1, wherein the same persistent data is written to each of the primary and secondary partitions during operation of the state machine.

5. A computer system as in claim 1, wherein the state machine disables and re-enables the primary write filter by renaming the primary write filter.

6. A computer system as in claim 1, wherein the need to write persistent data to the primary partition is a need to write an IP address to the primary partition.

7. A computer system as in claim 1, wherein the need to write persistent data to the primary partition is a need to update operating system components stored on the primary partition.

8. A computer system as in claim 1, wherein the need to write persistent data to the primary partition is a need to update application components stored on the primary partition.

9. A computer system as in claim 1, further comprising a data partition for storing persistent data which needs to be written to the primary partition.

10. A computer system as in claim 1, further comprising Microsoft Windows NT Embedded components installed on each of the primary and secondary partitions, wherein the primary write filter is a part of the Microsoft Windows NT Embedded components installed on the primary partition.

11. A computer system as in claim 1, further comprising a boot partition, wherein the state machine is embodied in program code stored on the boot partition.

12. A computer system as in claim 1, wherein the state machine is a Microsoft Windows NT Embedded service.

13. A computer system as in claim 1, further comprising an operating system stored on the primary partition, wherein the operating system comprises a system registry, wherein the system registry comprises a write filter status entry, and wherein the primary write filter is stored separately from the system registry.

14. A computer system, comprising:
   a. at least primary and secondary partitions;
   b. a primary write filter for write-protecting the primary partition; and
   c. a state machine, wherein the state machine, in response to a need to write persistent data to the primary partition, boots to the secondary partition, disables the primary write filter, boots to the primary partition, writes persistent data to the primary partition, re-enables the primary write filter, and then reboots to the primary partition.

15. A computer system as in claim 14, wherein the state machine disables and re-enables the primary write filter by renaming the primary write filter.

16. A method for writing persistent data to a normally write-protected primary partition of a computer system, comprising:
   a. installing an operating system on the primary partition of the computer system, and installing an operating system on a secondary partition of the computer system;
   b. enabling a write filter stored on the primary partition to thereby write-protect the primary partition; and
   c. upon a need to write persistent data to the primary partition, booting to the secondary partition, disabling the primary write filter, booting to the primary partition, writing persistent data to the primary partition, re-enabling the primary write filter, and then rebooting to the primary partition.

17. A method as in claim 16, wherein disabling and re-enabling the primary write filter comprise renaming the primary write filter.

18. A method as in claim 16, further comprising, when booted to the secondary partition, writing persistent data to the secondary partition.

19. A method as in claim 18, further comprising:
   a. prior to booting to the secondary partition, disabling a secondary write filter stored on the secondary partition; and
   b. after writing persistent data to the secondary partition, re-enabling the secondary write filter.

20. A computer system, comprising:
   a. at least primary and secondary partitions;
   b. a primary write filter for write-protecting the primary partition; and
   c. a state machine having at least two states, the states comprising:
      i. a first state, wherein:
         1. the computer system boots to the primary partition;
         2. the primary write filter is enabled; and
         3. the state machine advances to a second state in response to a need to write persistent data to the primary partition;
      ii. the second state, wherein:
         1. the computer system boots to the secondary partition; and
         2. during the second state, persistent data is written to the primary partition before the state machine advances to the first state.

* * * * *